UNITED STATES PATENT OFFICE 2,308,486

IMMERSION PROCESS OF FOOD FREEZING

Luis H. Bartlett, Austin, Tex., assignor to The University of Tennessee Research Corporation, Knoxville, Tenn., a corporation of Tennessee No Drawing. Application June 1, 1940, Serial No. 338,407

8 Claims. (Cl. 99—192)

This invention relates to the immersion process of freezing foods for the purpose of preserving the same.

It has heretofore been proposed to freeze food products such as fruits and vegetables by immersing them in a heat transfer liquid medium chilled to a temperature below the freezing point of the product. Attempts have been made to use as the heat transfer liquid, syrup, concentrated juices of the product being frozen, invert sugar solutions, and brine or other aqueous solutions.

In all of these proposed methods the liquid medium employed has been one which is miscible with the natural juices of the foods, and it has been found that such transfer liquid soon becomes contaminated by particles of the product being frozen, and by dissolved, gummy and mucilaginous substances, and diluted by the juices and adhering wash water. The accumulation of the gummy and mucilaginous substances increases the viscosity, and dilution raises the freezing point of the liquid to such an extent that it soon becomes inoperative.

The object of the present invention is to devise a method of immersion freezing in which these difficulties are avoided.

I find that this object may be accomplished by employing, instead of the aqueous solutions heretofore proposed, a heat transfer liquid which is of such a nature that it does not wet the surface of the products being frozen, and does not mix with their natural juices. By "wet" I mean form a substantially continuous film of liquid adhering to a surface. When such a liquid is employed, osmosis does not take place, and there is no dilution of the freezing medium by the juices of the products, and no accumulation of water soluble, gummy or mucilaginous substances therein.

After the frozen products are removed from a freezing liquid of the character just referred to, it is usually desirable to wash them in order to remove from them any of the freezing liquid which may be adhering. I find that the liquid used for this washing should be a liquid which is immiscible with the freezing medium, and which preferably is miscible with the natural juices of the products, and wets the surface of the frozen product.

With the foregoing general description, it is thought that the matter can be most clearly explained by means of specific examples. In the freezing of berries, such as strawberries or raspberries, for instance, according to my improved method, I proceed as follows.

The berries are first preferably washed with water, so that a film or coating of water adheres thereto. They are then immersed at atmospheric pressure in a bath of de-odorized non-volatile petroleum oil such as that known as "white mineral oil," of suitable viscosity, and having a relatively low freezing point, and a relatively high boiling point. This oil is maintained at a temperature well below the freezing point of the berries, and the berries are allowed to remain therein until completely congealed. The berries are then removed from the oil and drained or centrifuged to remove excess oil.

If desired, the drained berries may be packed for shipment or storage with the adhering film of oil remaining on them, which film serves to protect them from oxidation. Or, if desired, this oil film may be displaced and removed, and simultaneously another protective film deposited on the berries by washing or spraying them with a liquid which is insoluble in and immiscible with the oil, but which wets the frozen berries, or, rather, the ice film adhering to them. I find that a chilled aqueous sugar solution is eminently suitable for this purpose. The oil film is displaced by preferential wetting, and the syrup film replaces it.

The excess syrup is drained or centrifuged from the frozen product, and the entrained oil carried away by the syrup is removed by gravity settling or centrifuging. I find that by this process the oil finally adhering to the frozen berries may be reduced to 0.05% or less. No dilution of the wash syrup occurs since at the time of its application the berries are frozen hard, and, therefore, no leakage or osmosis can occur.

Similarly, other fruits, as well as vegetables such as asparatus, green peas, beans, etc., and also lean meats, may be frozen by my improved method, with the same advantages as with berries. In the case of vegetables and meats, however, the freezing liquid adhering to them is washed off by means of an aqueous solution such as salt water, instead of syrup.

While I have mentioned mineral oil specifically, it will, of course, be understood that numerous other non-volatile liquids may well be employed. Pure hydrocarbon oils, as for example nonane, decane, and undecane are especially suitable, owing to their desired viscosity, high boiling point, and low freezing point.

Similarly, certain animal or vegetable fatty oils can be employed as the freezing medium, provided the freezing or crystallization point of these oils is sufficiently low. Examples of such oils that may be employed are linseed oil and walnut and almond oil.

It will be observed that the essential thing is that the freezing medium must be immiscible with the natural juices of the fruits or vegetables, or with the film of wash water with which they are usually coated. Since these juices are of an aqueous nature, it is desirable to use a non-aqueous liquid as the freezing medium.

While I have specifically mentioned oils and oily liquids, it will be understood that there are a number of other substances which may be employed as well, provided that their physical properties are such as to render them suitable. The liquid constituting the freezing medium must, of course, in addition to being immiscible with aqueous solutions, be non-toxic if taken internally, and it must have a freezing or crystallizing point well below the freezing point of the product being treated. It must also have the proper viscosity and suitably high boiling point and must not be such as to impart to the product any objectionable taste or odor.

Subject to the above requirements, certain esters of the organic acids, including glycerides, may be used, and probably also a few suitable ethers, ketones, and higher alcohols. Examples of possible esters are ethyl linoleate, methyl oleate, tri-glyceryl linoleate, triolein and tri-linolein.

The same general principle may be employed in the freezing of food products other than fruits and vegetables, as for example fats such as butter and lard, or meat products covered with fat or grease. Fats of this nature may be frozen by immersion in an aqueous solution such, for example, as brine, sugar solutions or diluted glycerol, which do not wet the fats. When removed from this solution, any of it adhering to the products may be washed off by means of a suitable edible oil, such as almond, linseed or corn, or a refined mineral oil. Here the relation is the reverse of that described in connection with foods having aqueous juices. The same principle obtains, however, namely, that the freezing liquid does not wet the product, while the liquid used to remove or displace the freezing liquid adhering to the product does wet or cling to the surface of the product, forming a protective film.

What I claim is:

1. The method of preserving food substances which comprises the steps of immersing the substance in a non-volatile liquid which will not wet the substance and which is chilled to a temperature below the congelation point of the substance, allowing the substance to remain in said liquid until congealed, removing the substance from the liquid and washing the substance with a second liquid which will wet the substance but which is immiscible with the first liquid, and finally storing the washed substance at a suitably low temperature.

2. The method of preserving food substances by freezing which comprises coating the substance with a first liquid, immersing the coated substance in a second liquid immiscible with the first and which is maintained at a temperature below the freezing point of said substance, and allowing it to remain until congealed, and then removing the substance from the freezing liquid and washing it with a third liquid, immiscible with the freezing liquid, but miscible with the coating, such washing serving to remove from the frozen substance any of the freezing liquid which may adhere thereto.

3. The method of preserving edible substances by freezing which comprises first coating the substance with an aqueous liquid, then immersing the coated substance in a non-volatile liquid immiscible with said aqueous liquid and maintained at a temperature below the freezing point of the substance and allowing it to remain until congealed, and finally removing the frozen substance and washing it with an aqueous liquid to remove any of the freezing liquid which may adhere thereto.

4. The method of preserving vegetable substances by freezing which comprises first coating the substance with water, then immersing the coated substance at atmospheric pressure in a non-volatile liquid insoluble in water and maintained at a temperature below the freezing point of the substance and allowing it to remain until congealed, and finally removing the frozen substance and washing it with an aqueous liquid to remove any of the freezing liquid which may adhere thereto.

5. The method of preserving fruits and vegetables by freezing which comprises the steps of immersing them at atmospheric pressure in a non-volatile liquid which is immiscible with the natural juices of such fruits and vegetables and which is maintained at a temperature below the freezing point of such fruits and vegetables, allowing them to remain in such liquid until congealed, and then removing and washing them with a liquid miscible with their natural juices but immiscible with the freezing liquid.

6. The method of preserving fruits by freezing which comprises washing them with water, then immersing them in a non-volatile liquid insoluble in water and maintained at a temperature below the freezing point of the fruits, and allowing them to remain until congealed, and finally removing them from such liquid and washing them with an aqueous syrup solution.

7. The method of preserving fruits by freezing which comprises washing them with water, then immersing them in a non-volatile hydrocarbon oil insoluble in water and maintained at a temperature below the freezing point of the fruits, and allowing them to remain until congealed, and finally removing them from such oil and washing them with an aqueous solution.

8. In a method of preserving vegetable substances by freezing, the steps which comprise immersing the substance in and with its surface in direct contact with a liquid which is non-volatile at atmospheric pressure and normal temperature, and which will not wet the surface of the substance, such liquid being chilled to a temperature below the congelation point of the substance, allowing the substance to remain in contact with the liquid until congealed, and then removing the same from the liquid.

LUIS H. BARTLETT.